(12) United States Patent
Weng

(10) Patent No.: US 7,671,847 B2
(45) Date of Patent: Mar. 2, 2010

(54) TOUCH PANEL AND METHOD FOR MANUFACTURING THE SAME

(75) Inventor: Chien-Sen Weng, Chupei (TW)

(73) Assignee: AU Optronics Corp., Hsinchu (TW)

( * ) Notice: Subject to any disclaimer, the term of this patent is extended or adjusted under 35 U.S.C. 154(b) by 1092 days.

(21) Appl. No.: 11/326,438

(22) Filed: Jan. 6, 2006

(65) Prior Publication Data

US 2006/0152500 A1 Jul. 13, 2006

(30) Foreign Application Priority Data

Jan. 7, 2005 (TW) .............................. 94100524 A

(51) Int. Cl.
*G09G 5/00* (2006.01)
(52) U.S. Cl. ........................................ 345/173; 345/87
(58) Field of Classification Search .................. 345/60, 345/76, 87, 156, 166, 168, 169–170, 172–177; 349/12, 23, 160; 178/18.01, 19.01
See application file for complete search history.

(56) References Cited

U.S. PATENT DOCUMENTS 6,492,978 B1 * 12/2002 Selig et al. .................. 345/173
6,501,529 B1 * 12/2002 Kurihara et al. ............. 349/160

FOREIGN PATENT DOCUMENTS

| CN | 1469110 A | 1/2004 |
|---|---|---|
| CN | 1477912 A | 2/2004 |
| JP | 62-88322 U | 6/1987 |
| JP | 63-204374 A | 8/1988 |
| JP | 8-314612 A | 11/1996 |

* cited by examiner

*Primary Examiner*—Richard Hjerpe
*Assistant Examiner*—Mansour M Said
(74) *Attorney, Agent, or Firm*—Birch, Stewart, Kolasch & Birch, LLP

(57) ABSTRACT

A touch panel for an electronic apparatus is provided. The touch panel comprises a thin film transistor substrate, a plurality of conductive islets, a supporting pattern layer and an elastic conductive film. The plurality of conductive islets is formed on the thin film transistor substrate. The supporting pattern layer is formed above the thin film transistor substrate. The supporting pattern layer has a plurality of apertures. Each of the plurality of apertures for exposing at least part of each of the plurality of conductive islets. The elastic conductive film is formed on the supporting pattern layer.

14 Claims, 16 Drawing Sheets

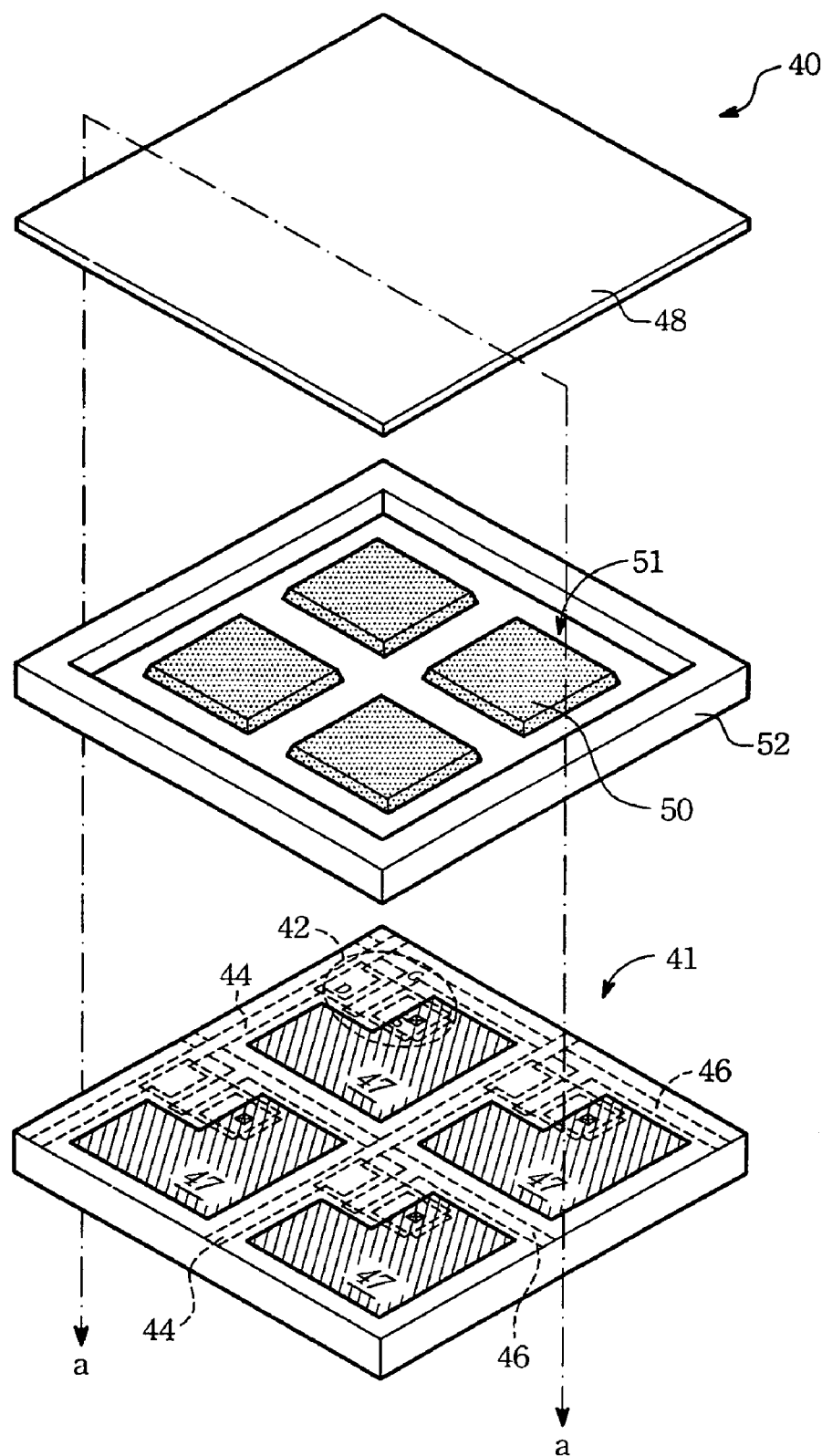
F I G . 6 A

TOUCH PANEL AND METHOD FOR MANUFACTURING THE SAME

BACKGROUND OF THE INVENTION (1) Field of the Invention

The present invention relates to a touch panel, and more particularly, relates to a supporting structure of the touch panel.

(2) Description of the Prior Art

With the development of science and technology, there is a tendency toward diversification among the input devices of electronic product. Besides the typical input devices such as keyboard or mouse, a touch panel, one of the input devices, becomes much more popular than before. A touch panel with fingerprint identification function can be applied to a user identification system of electronic products, such as notebook computer, PDA and cell phone, or be applied to a door control system, especially for some research institution, hi-tech company, or military unit. In last years, the touch panel is integrated with the display (or monitor) of a tablet computer. Therefore, an user can operate the tablet computer by touching or writing on its monitor.

Referring to FIG. 1 is show a typical resistive touch panel 10. This kind of touch panel 10, which is applied to an electronic apparatus as its input device, has no fingerprint identification function. The touch panel 10 comprises a conductive sheet 12, an elastic conductive film 16, a plurality of ball spacers 14. The plurality of ball spacers 14 are formed between the conductive sheet 12 and the elastic conductive film 16 formed above the conductive sheet 12, to make the conductive sheet 12 separate from the elastic conductive film 16.

Two opposite sides 12a, 12b of the conductive sheet 12 electrically connect to two different voltage levels, resulting in a voltage gradient on the conductive sheet 12. The voltage gradient is perpendicular to y-axis shown in FIG. 1. Two opposite sides 16a, 16b of the elastic conductive film 16 have two different voltage levels, resulting in a voltage gradient on the elastic conductive film 16. The voltage gradient is perpendicular to x-axis shown in FIG. 1. While a user exerts pressure on the elastic conductive film 16 to make the elastic conductive film 16 touch the conductive sheet 12, the different voltage levels on the conductive sheet 12 and on the elastic conductive film 16 will be changed. A touched position of a finger can be detected by voltage level values of four corner of the elastic conductive film 16.

Fingerprint is a pattern that would touch a plurality of positions, therefore, fingerprint identification function cannot be applied to the touch panel 10. In other words, the touch panel 10 can only detect one touched position at a time Referring to FIG. 2A and FIG. 2B. FIG. 2A is a top view of a typical touch panel 20 with fingerprint identification function. FIG. 2B is a cross-sectional view of touch panel 20 shown in FIG. 2A along cross-sectional line a-a. The touch panel 20 comprises a thin film transistor substrate 21, a plurality of conductive islets 27, an elastic conductive film 28, and a sealant layer 29.

The thin film transistor substrate 21 comprises a base 25, an array of thin film transistors 22, a plurality of data lines 24, a plurality of scan lines 26, and an protective layer 23. The plurality of data lines 24 are vertical arranged on the base 25, the plurality of scan lines 26 are horizontal arranged on the base 25 and across the plurality of data lines 24 to divide into a plurality of sections (no shown). Each of the thin film transistors 22 is respectively located on each of the sections, wherein each drain of the thin film transistors 22 connects adjacent to each data line 24, and each source of the thin film transistors 22 connects adjacent to each data line 24. The protective layer 23 is formed on the base 25 for protecting the array of thin film transistors 22, the plurality of scan lines 26, the plurality of data lines 24.

A plurality of conductive islets 27 are formed on the thin film transistor substrate 21. Each of conductive islets 27 is electrically and respectively connects to each source of the thin film transistors 22 through each of through holes (no shown) formed in protective layer 23. The sealant layer 29 is formed between the plurality of conductive islets 27 and the elastic conductive layer 28 formed above the plurality of conductive islets 27. The sealant layer 29 is formed on the thin film transistor substrate 21, and is located in a periphery area of the thin film transistor substrate 21. In other words, the sealant layer 29 is surrounding the edge of the thin film transistor substrate 21.

While a touch pen, for example, exerts pressure on the touch panel 20 to make a portion of the elastic conductive film 28 touch in corresponding to a portion of the conductive islets 27, at least a signal is generated from the portion of the conductive islets 27, and further is transmitted in corresponding to at least one source of the thin film transistors 22. Furthermore, the thin film transistor substrate 21 can scan signals by the plurality of scan lines 26 so as to detect positions of the signals by the plurality of data lines 24 to determine the touched positions.

Compared the touch panel 10 of FIG. 1 with the touch panel 20 of FIG. 2, the touch panel 20 can detect multi-touched positions at a time; however, the touch panel 10 can only detect a touch position at a time. The thin film transistor substrate 21 scans signals, and further determines the touched positions in a short time. For example, a scan of all signals, from all of the thin film transistors 22, only need 16 milliseconds, at a scanning frequency of 60 Hz. Therefore, the touch panel 20 is able to detect a plurality of touched positions. Utilizing integrated circuit fabrication techniques to fabricate the plurality of thin film transistors 22, the touch panel 20 is capable of detecting extremely small features or patterns, ex. application of fingerprint identification.

However, in the prior arts, the elastic conductive film 28 is only supported by the sealant layer 29 to be located above the conductive islets 27. The sealant layer 29 is formed on a periphery area of the thin film transistor substrate 21, so an interior portion of the elastic conductive film 28 is supported by nothing. The elastic conductive film 28 is generally made of a flexible material, such as polyethylene terephthalate (PET), polymethyl methacrylate (PMMA), polycarbonate (PC), polypropylene (PP), polyethylene (PE), or like as. Therefore, the surface flatness of the elastic conductive film 28 is not easy to be controlled while fabricating the touch panel 20.

After the touch panel 20 is used for a long period, the strength of the elastic conductive film 28 usually drops because of continuous pressings. The flatness of the elastic conductive film 28 is also destruct because of fatigue. While the strength of the elastic conductive film 28 usually drops to a level that the elastic conductive film 28 is not able to be separated from the conductive islets 27, the signals will be constantly generated without exerting any pressure. Then, the touch panel 20 is totally broken.

The touch panel 20 can also be made of transparent material so as to be applied to a surface of a display panel, a monitor, or a tablet computer. Light from the display panel and finally reaching the user's eyes has to be transmitted through the touch panel 20. So the flatness of the elastic conductive film 28 becomes an important condition to displaying quality.

In the prior arts, an initial solution to the above mentioned problems is using ball spacers 14, which are formed on the thin film transistor substrate 21 by spin coating. Then further utilizes a baking process to make ball spacers 14 solidified to support the interior area of the elastic conductive film 28. But there are still two problems: First, the thin film transistor substrate 21 will be contaminated or corroded by the solution of the initial materials of the ball spacers 14. This would lower the detecting sensitivity. Second, because the spin coating method, the ball spacers 14 are generally and disorderly distributed on the thin film transistor substrate 21. Size of the ball spacers is also not of even, so the flatness of the thin film transistor substrate 21 is therefore defeated. An even worse situation is that some positions lose its detecting ability because of the location-disordered and size-unequal ball spacers 14. Therefore, this prior solution cannot effectively solve the above-mentioned problems.

Therefore, improving the remaining drawbacks of the prior arts and further enhancing quality, stability, and product life time of the touch panel is an important issue to the related technique field.

SUMMARY OF THE INVENTION

It is the primary objective of the present invention to provide a touch panel, which is capable of fingerprint identification, with a new supporting structure.

It is another objective of the present invention to improve the stability and fabricating quality of the touch panel.

It is another objective of the present invention to improve product life time of the touch panel.

It is another objective of the present invention to provide a touch panel with fingerprint identification function, which is more suitable to be applied to the display screen of the electronic apparatus.

A touch panel comprises a thin film transistors, a plurality of conductive islets, a supporting pattern layer, and an elastic conductive film. The plurality of conductive islets are formed on the thin film transistor substrate. The supporting pattern layer is formed above the thin film transistor substrate, and has a plurality of apertures for exposing at least part of each of the plurality of the conductive islets. The elastic conductive layer is formed on the supporting pattern layer.

The advantage and spirit of the present invention may be understood by the following recitations together with the appended drawings.

BRIEF DESCRIPTION OF THE DRAWINGS

The present invention will now be specified with reference to its preferred embodiment illustrated in the drawings, in which

FIG. 6A shows an exploded view of a portion of the touch panel of the present invention;

DESCRIPTION OF THE PREFERRED EMBODIMENT

Figure 3A:
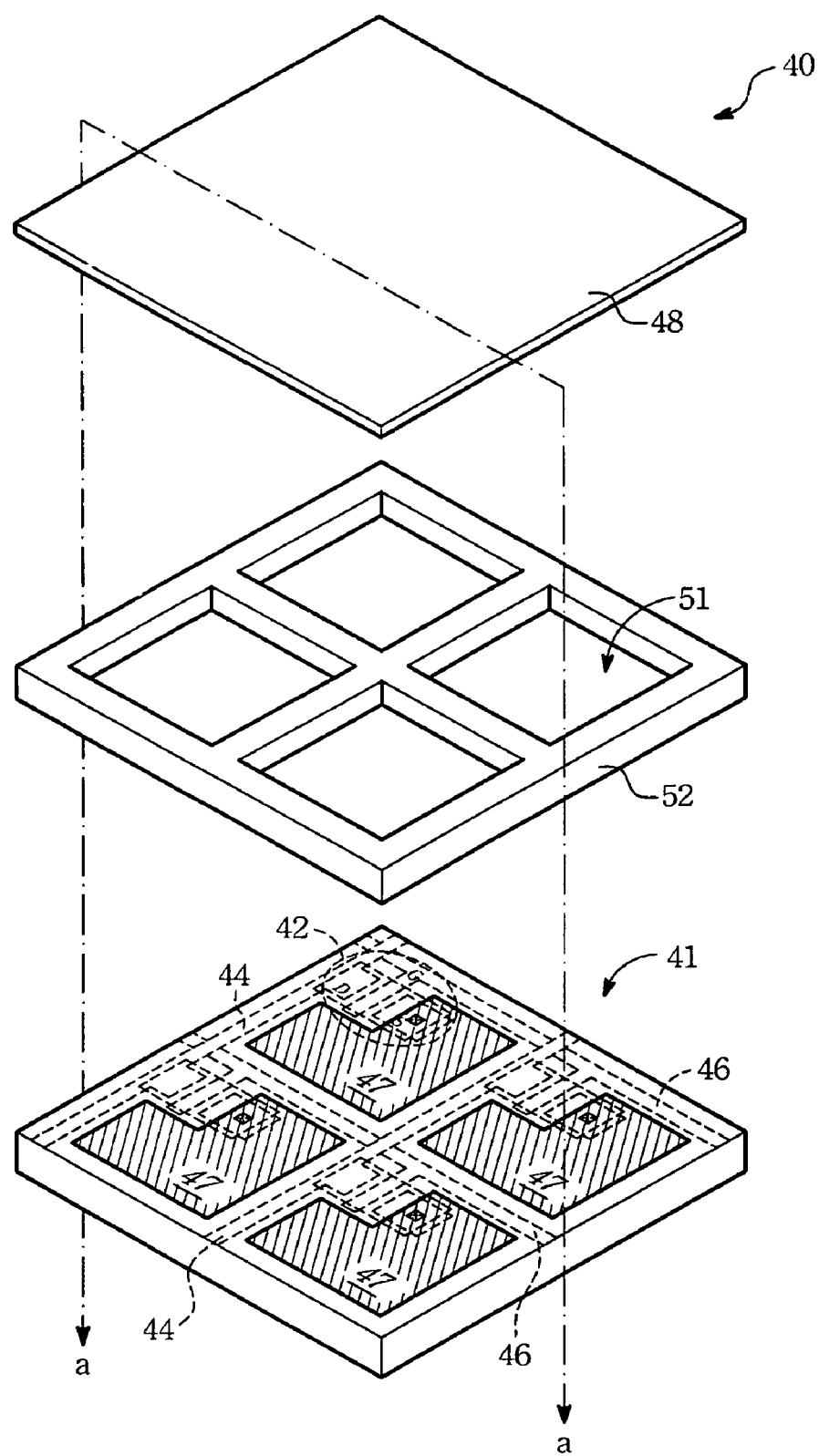
FIG. 3A shows an exploded view of a portion of a touch panel of the present invention.
Figure 3B:
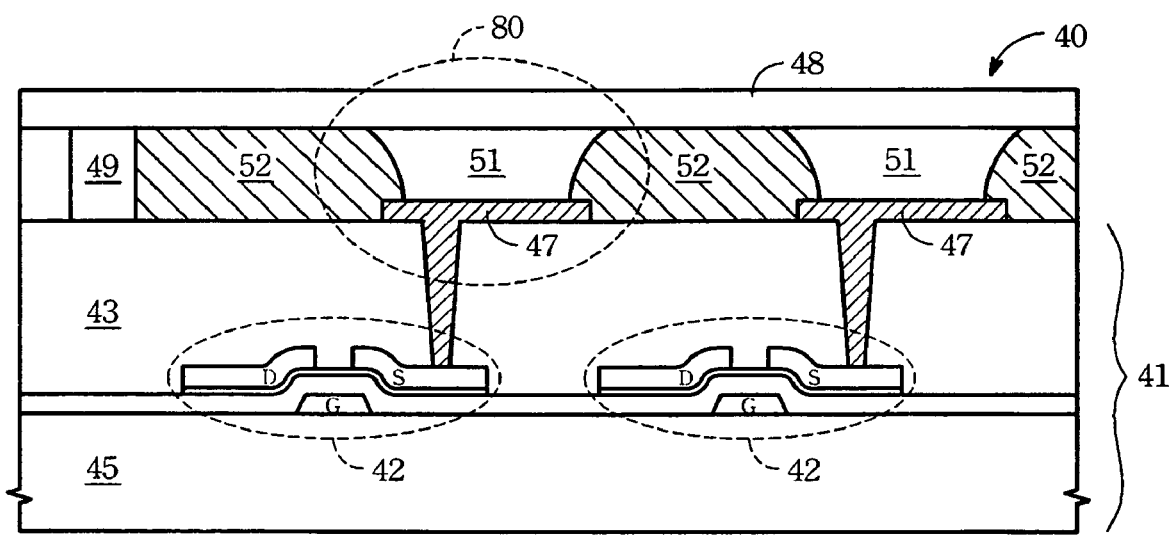
FIG. 3B is a cross-sectional view of the touch panel shown in FIG. 3A along cross-sectional line a-a.

Referring to FIG. 3A and FIG. 3B. FIG. 3A shows an exploded view of a portion of a touch panel of the present invention. FIG. 3B is a cross-sectional view of the touch panel 40 shown in FIG. 3A along cross-sectional line a-a. FIG. 3A shows only four pieces of thin film transistors (TFTs) 42 for illustration. In the drawings, the thin film transistor 42 belongs to a bottom gate type, however, top gate typed thin film transistors can also be applied. The touch panel 40 can be applied to an electronic apparatus, ex. display panel, monitor, tablet computer, or like as. Any the display panel comprises liquid crystal display (LCD), organic light emitting display (OLED), polymer light emitting display (PLED), filed-emitting display (FED), plasmas display panel (PDP), surface-conduction electron-emitter display (SED), or like as. The touch panel 40 comprises a thin film transistor substrate 41, a plurality of conductive islets 47, a supporting pattern layer 52, and an elastic conductive film 48.

The thin film transistor substrate 41 comprises a base 45, an array of thin film transistors 42, a plurality of data lines 44, a plurality of scan lines 46, and a protective layer 43. The plurality of scan lines 46 and the plurality of data lines 44 interlace on the base 45 to define a plurality of sections. Each of the thin film transistors 42 is respectively located in a section (no shown). The drain of the thin film transistor 42 electrically connects to one of the data lines 44, and the source of the thin film transistor 42 electrically connects to one of the scan lines 46. The protective layer 43 is formed on the base 45 for protecting the array of thin film transistors 42, the plurality of scan lines 46 and the plurality of data lines 44.

The protective layer 43 is made of an organic material or an inorganic material, for insulating and protecting the thin film transistors. The inorganic material, by example: a compound consisting of silicon, nitrogen and oxygen (such as $SixNz$, $SixOy$, $SixOyNz$, or like as), an phosphosilicate glass (PSG) doped with ions, a metal oxide, or like as. The inorganic material, by example: a photo resist, a compound consisting of silicon, carbon, hydrogen and oxygen (such as $SixOyCn$, $SixOyCnHm$, $SixCn$, or like as).

Referring to FIG. 3B. Each conductive islets 47 is electrically connected to the source of each thin film transistor 42 through a through hole formed in the protective layer 43. Material of the conductive islet 47 comprises indium-tin oxide, indium-zinc oxide, oxide, gold, aluminum, platinum, palladium, copper, molybdenum, titanium, aluminum, conductive rubber, or a combinations thereof. The supporting pattern layer 52, formed above the thin film transistor substrate 41, has a plurality of apertures 51 for exposing at least part of each of the plurality of conductive islets 47. The supporting pattern layer 52 is made of an insulating material. As to the method for forming the plurality of apertures 51, a photo-etching process is applied.

In some embodiments, the insulated material of the supporting pattern layer 52 is organic material comprising polycarbonate (PC), benzocyclobutene (BCB), acryl organic material, fluorine-added polyimide, a compound consisting of silicon, carbon and oxygen (SixOyCn), Teflon, Parylene, a silicon compound that is combined with carbon, hydrogen, oxygen etc, or like as. In other embodiments, the insulated material of the supporting pattern layer 52 is inorganic material such as silicon compound that is combined with nitride, oxide or both of nitride and oxide ($Si_xN_z$, $Si_xO_y$, $Si_xO_yC_n$, ... . etc.), an phosphosilicate glass (PSG) doped with ions, a metal oxide, or combinations thereof.

After forming the supporting pattern layer 52, the elastic conductive film 48 is formed on the supporting pattern layer 52 to complete the fabrication of the present invention. The elastic conductive film 48 is substantially made of flexible material comprising polyethylene terephthalate (PET), polymethylmethacrylic (PMMA), polycarbonate (PC), polypropylene (PP), polyethylene (PE), or like as. Besides, a conductive layer is formed on the bottom surface of the elastic conductive film 48. In some embodiments, the conductive layer is made of transparent material such as indium tin oxide (ITO), indium zinc oxide (IZO), or like as. In other embodiments, the conductive layer is made of un-transparent material such as gold (Au), aluminum (Al), platinum (Pt), palladium (Pd), copper (Cu), molybdenum (Mo), titanium (Ti), alloy of these metals, or a combination thereof. In another embodiments, the conductive layer is made of half-transparent material such as conductive rubber.

While a finger, for example, exerts pressure on the touch panel 40 to make a portion of the elastic conductive film 48 touch one or more the conductive islets 47, at least a signal is generated because of the electrical conduction and is further transmitted to the source of the thin film transistors 42. Through serial scans utilizing the plurality of scan lines 46 and the plurality of data lines 44 toward all of the thin film transistors 42, the touched positions, even a plurality of touched positions forming pattern such as a fingerprint, on the thin film transistor substrate 41 is thus obtained.

The supporting pattern layer 52 is used for supporting the elastic conductive film 48 and for separating the elastic conductive film 48 from the conductive islets 47. Of course, a sealant layer 29 (shown in FIG. 2A and FIG. 2B) according to the prior arts can also be used to be formed on the periphery area of thin film transistor substrate 41, and to improve the separation between the elastic conductive film 48 and the conductive islets 47.

Figure 1:
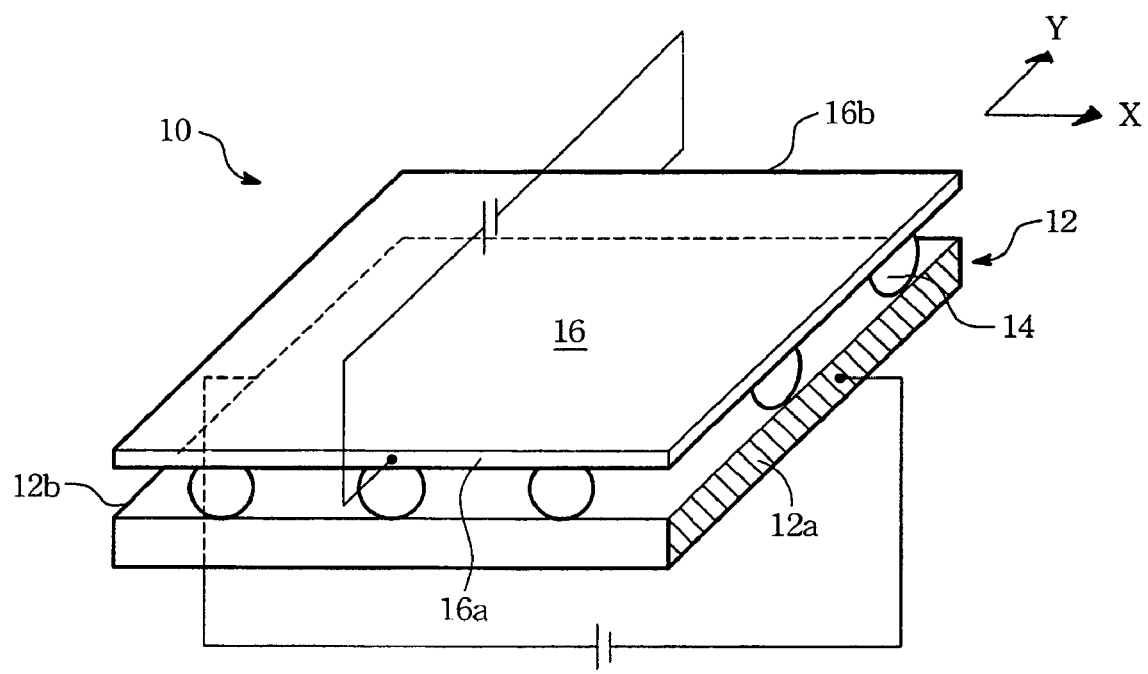
FIG. 1 shows a typical resistive touch panel.
Figure 2A:
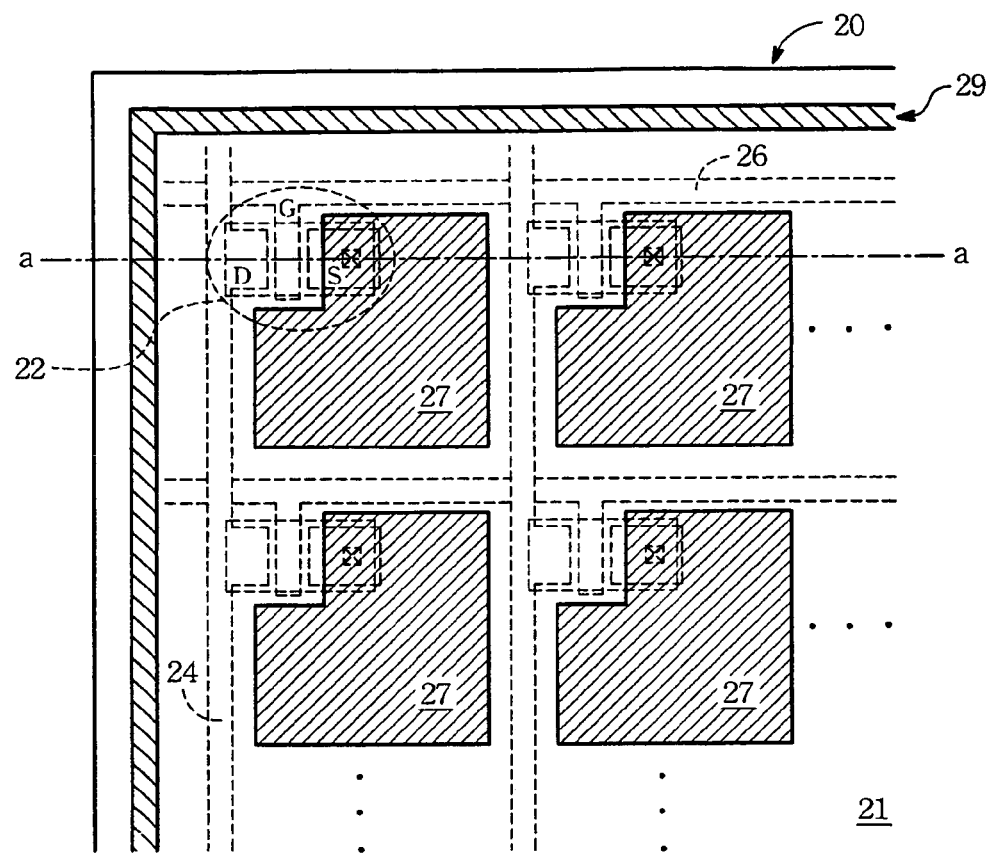
FIG. 2A is a top view of a typical touch panel with fingerprint identification function.
Figure 2B:
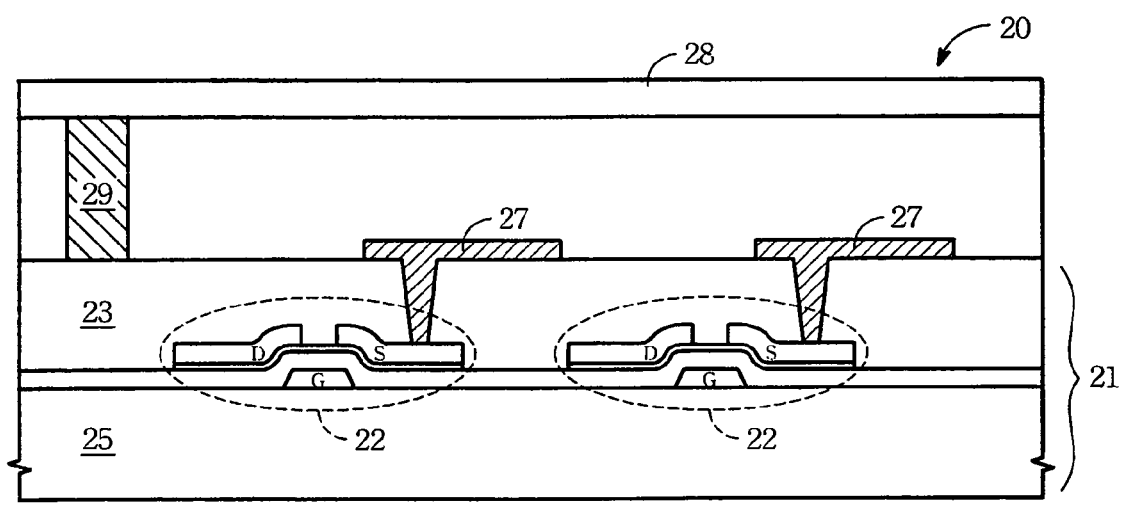
FIG. 2B is a cross-sectional view of touch panel 20 shown in FIG. 2A along cross-sectional line a-a.

Compared the elastic conductive film 28 with the sealant layer 29 of FIG. 2A and FIG. 2B of the prior art. The sealant layer 29 (shown in FIG. 2A and FIG. 2B) is only used for supporting the periphery area of the elastic conductive film 28 (shown in FIG. 2A and FIG. 2B), the interior area of the elastic conductive film 28 (shown in FIG. 2A and FIG. 2B) is therefore suspended. In other words, the sealant layer 29 of the prior art is capable of supporting in the interior area of the elastic conductive film. As to the present invention, the supporting pattern layer 52 is capable of uniformly supporting the elastic conductive film 48. Even the interior area of the elastic conductive film 48 is supported. Therefore, compared with the prior art, the supporting ability of the present invention is much more remarkable.

Figure 4A:
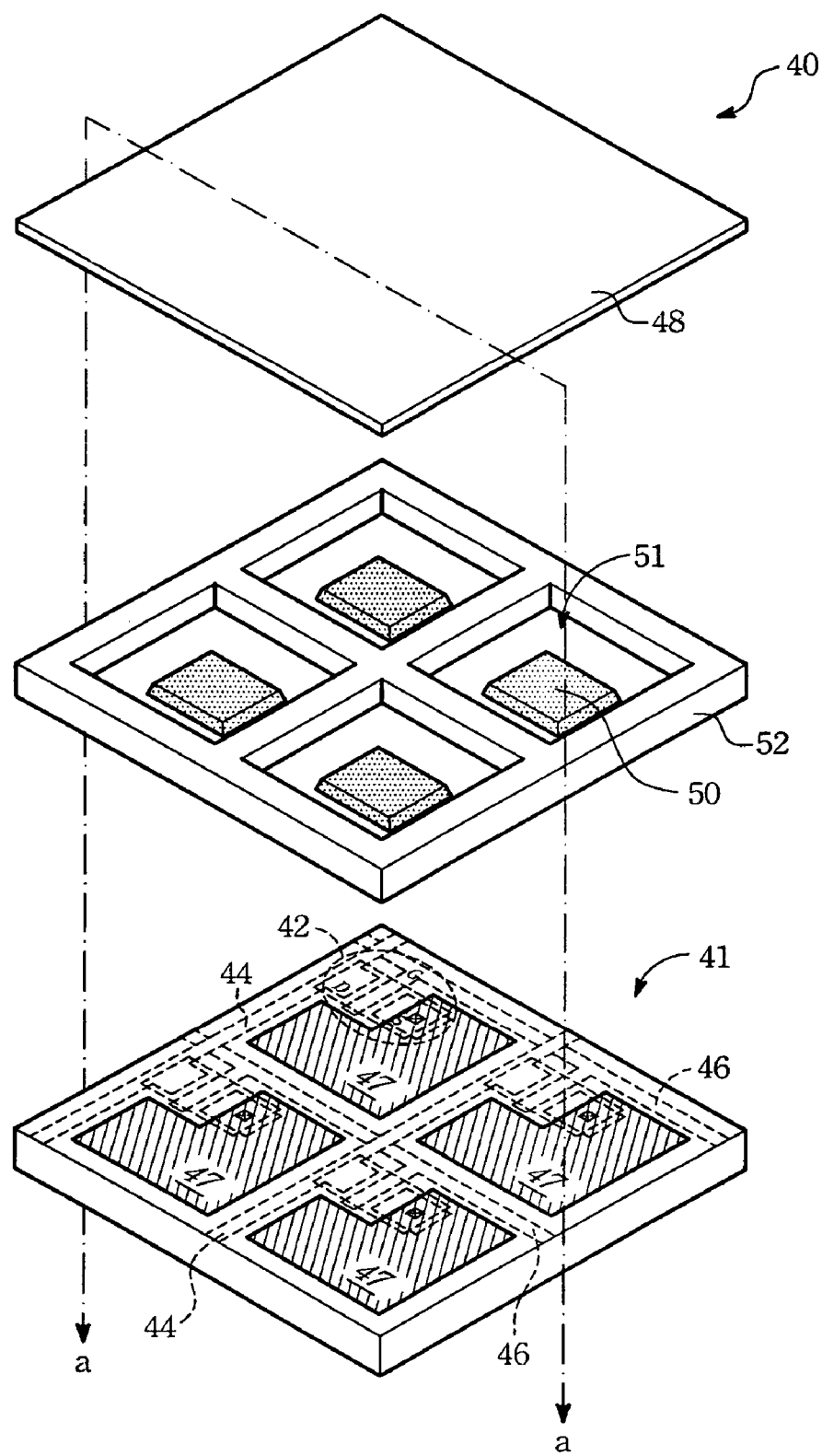
FIG. 4A shows an exploded view of a portion of the touch panel of the present invention.
Figure 4B:
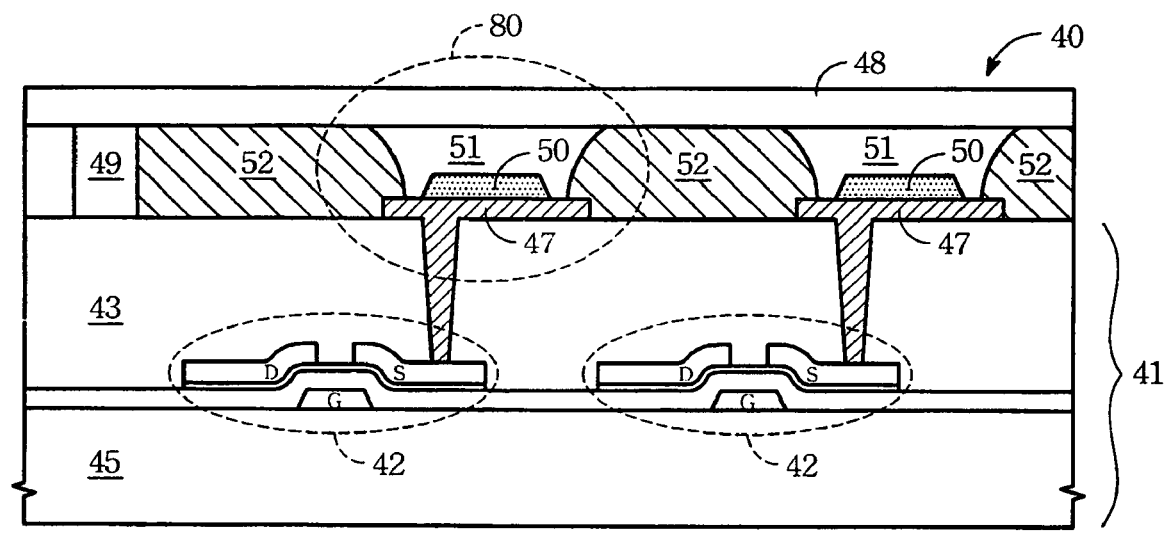
FIG. 4B is a cross-sectional view of the touch panel shown in FIG. 4A along cross-sectional line a-a.

Referring to FIG. 4A and FIG. 4B. FIG. 4A shows an exploded view of a portion of the touch panel of the present invention. FIG. 4B is a cross-sectional view of the touch panel 40 shown in FIG. 4A along cross-sectional line a-a. In the drawings, the thin film transistor 42 belongs to a bottom gate type. However, top gate typed thin film transistors can be applied either. In present embodiment, the touch panel 40 further comprises a plurality of conductive protrusions 50. The conductive protrusion 50 is formed on the conductive islet 47 and the conductive protrusion 50 is located in the aperture 51 of the supporting pattern layer 52. The thickness of the conductive protrusions 50 is substantially less than the thickness of the supporting pattern layer 52. The thickness of the supporting pattern layer 52 ranges from about 1.5 micrometer (um) to about 3.0 micrometer (um). The thickness of the conductive protrusions 50 ranges from about 0.8 um to about 1.0 um. The conductive protrusion comprises indium-tin oxide, indium-zinc oxide, oxide, gold, aluminum, platinum, palladium, copper, molybdenum, titanium, aluminum, conductive rubber, or combinations thereof. In some embodiments, the conductive protrusion 50 is made of transparent material such as indium tin oxide (ITO), indium zinc oxide (IZO), or like as. In other embodiments, the conductive protrusion 50 is made of un-transparent material such as gold (Au), aluminum (Al), platinum (Pt), palladium (Pd), copper (Cu), molybdenum (Mo), titanium (Ti), alloy of these metals, or a combination thereof. In another embodiments, the conductive protrusion 50 is made of half-transparent material such as conductive rubber.

Referring to FIG. 4B. The conductive protrusion 50 is formed on the conductive islet 47. So the conductive islet 47 is able to electrically connect to the thin film transistors 42 through the conductive protrusion 50. Compared with the embodiment of FIG. 3B, while user touch the touch panel 40 shown in FIG. 4B, it is more easier to make the elastic conductive layer 48 touching the conductive protrusion 50 than touching the conductive islet 47 shown in FIG. 3B. In other words, the embodiment of FIG. 4A and FIG. 4B provides a touch panel, which has advanced sensibility.

Figure 5A:
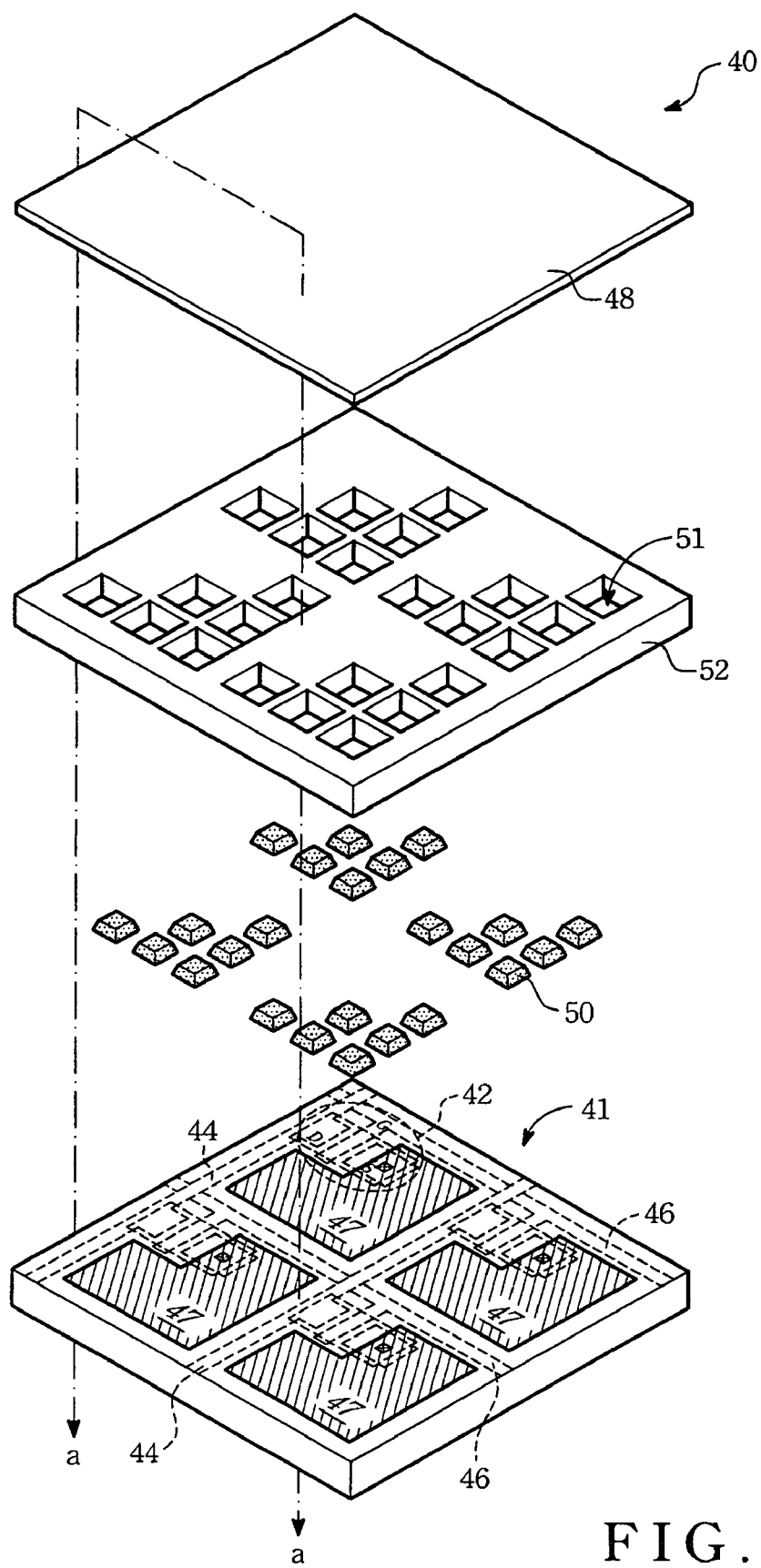
FIG. 5A shows an exploded view of a portion of the touch panel of the present invention.
Figure 5B:
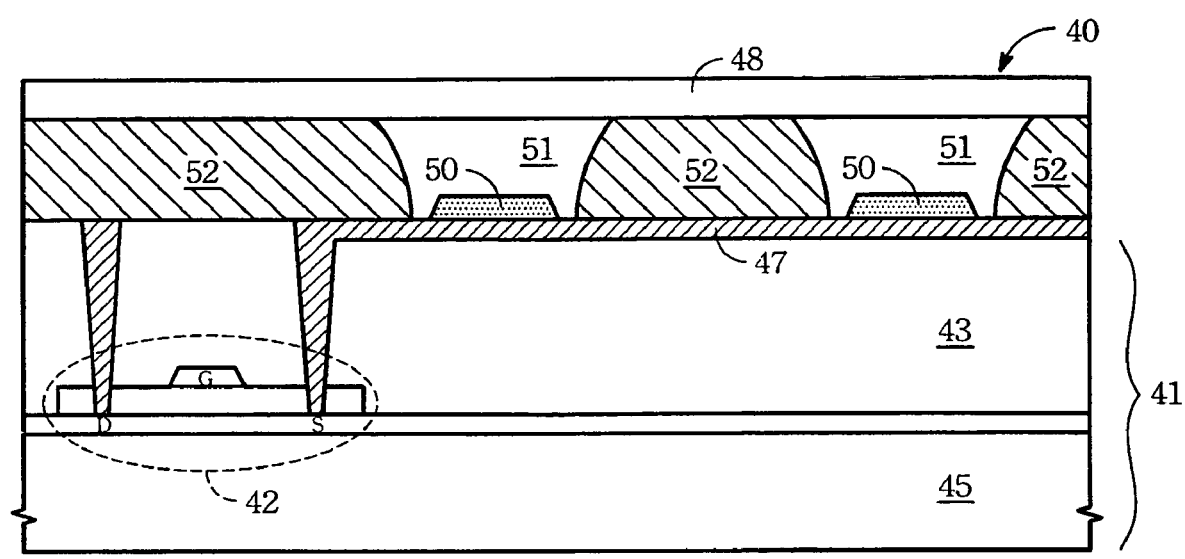
FIG. 5B is a cross-sectional view of the touch panel shown in FIG. 5A along cross-sectional line a-a.

Referring to FIG. 5A and FIG. 5B. FIG. 5A shows an exploded view of a portion of touch panel of the present invention. FIG. 5B is a cross-sectional view of the touch panel 40 shown in FIG. 5A along cross-sectional line a-a. In the present embodiment, the number and the size of the plurality of apertures 51 is different from the mentioned embodiments. In FIG. 5A and FIG. 5B, the thin film transistor 42 belongs to a top gate type, however, bottom gate typed thin film transistors can be applied either. Each aperture 51 has a relatively smaller size than the previous embodiments. Every six apertures 51 correspond to one of the plurality of conductive islets 47 and expose six parts of one of the conductive islets 47. Compared the previous embodiments, the shape-changed supporting pattern layer 52 is capable of providing a more reliable and more evenly supporting-ability to the elastic conductive layer 48.

FIG. 5A shows the aperture 51 being a square shape with dimension of 10 um×10 um. For sure, this size and shape shall not be the limit to the present invention. As long as the shape is easy to be formed and without negative effect on electrical conduction of the conductive islet 47 and the touch panel 40, any shape can be adopted for the aperture 51. For example, rhombus, square, circle, oval, or polygon.

In this embodiment, the conductive protrusion 50 is formed on the conductive islet 47 and in each of the apertures 51. As shown FIG. 5A, each of the six conductive protrusions 50 are respectively formed in one of the apertures 51. As shown in FIG. 5B, the thickness of the supporting pattern layer 52 is substantially greater than the thickness of the conductive protrusion 50. As long as the shape of the conductive protrusion 50 can accommodate the shape of the aperture 51, any shape of the conductive protrusion 50 can be adopted for the present invention.

It is worth to be mentioned here that while an user touches the elastic conductive film 48 to make the elastic conductive film 48 touch one or more the conductive protrusions 50 of a specific conductive islet 47. The touched position on the touch panel 40 is detectable of one of the thin film transistors 42, which is electrically connected with the specific conductive islet.

Figure 6B:
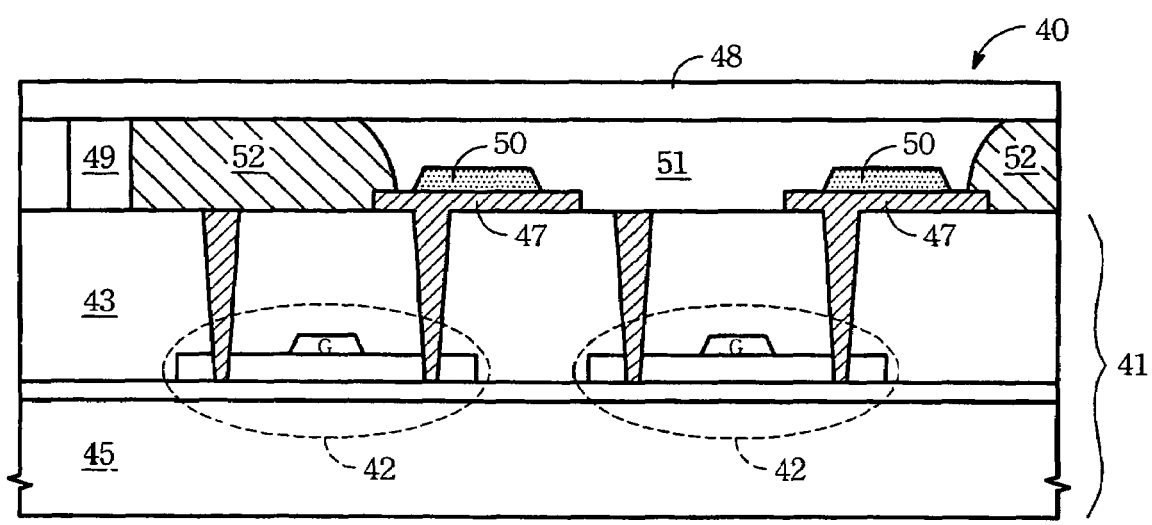
FIG. 6B is a cross-sectional view of the touch panel shown in FIG. 6A along cross-sectional line a-a.

Referring to FIG. 6A and FIG. 6B. FIG. 6A shows an exploded view of a portion of the touch panel of the present invention. FIG. 6B is a cross-sectional view of the touch panel 40 shown in FIG. 6A along cross-sectional line a-a. In the drawings, the thin film transistor 42 belongs to a top gate type, however, bottom gate typed thin film transistors can be applied either.

In present embodiment, the supporting pattern layer 52 have been changed its shape. Within each one of the apertures 51 expose to the_at least four conductive protrusions 50. Compared with the previous embodiments, the supporting pattern layer 52 of the present embodiment have an aperture 51 having the biggest size, of course, basing on the same size of the touch panel 40. Although the supporting ability might be slightly weaker than the previous embodiments, however, compared with the prior arts, the supporting ability of this embodiment is quite enough to overcome the prior drawback, which refer to the suspending interior area of the elastic conductive film 48. Besides, in practice, the plurality of aperture 51 is distributed evenly among the whole supporting pattern layer 52, which provide a stable and evenly distributed supporting force.

The touch panel 40 of the present invention is applied to the electronic apparatus as its input device. While the touch panel 40 is applied to the screen of the electronic apparatus such as tablet computer, monitor, or display panel, the touch panel 40 has to be transparent or translucent to avoid lowering display quality. Mentioned transparent materials of the conductive layer 43, the supporting pattern layer 52, the conductive islet 47 and the conductive protrusion 50 are all based on this display concern. Besides, as to the base 45 and the elastic conductive film 48, the transparent material, such as glass, polymer, an organic material, or an inorganic material (such as silicon compound) is suitable to be adopted.

It is deserved to be mentioned that a preferred embodiment is to adopt specific organic material, which is used in the ultra high aperture (UHA) panel fabrication method, for the supporting pattern layer 52. These specific materials are generally used for enlarging supporting altitude of liquid crystal display panel. Meanwhile, it is transparent and is particularly suitable for fabricating liquid crystal display panel with high aperture ratio. About this preferred embodiment, more details are going to be introduced in the manufacturing method paragraph.

However, while the touch panel 40 is applied to electronic apparatus having no display screen, property of light transparent is no longer essential. For example, the touch panel 40 can be applied to a door control system as its fingerprint identification board so as to identify the person who is tending to enter. Because the property of light transparent of the touch panel is no longer essential in this kind of application, material selection of each component becomes more flexible. It is obvious for a person having ordinary skill in the art to adopt different applicable materials to complete the present invention. Therefore, the detailed descriptions of those different materials will be disregarded.

Figure 7A:
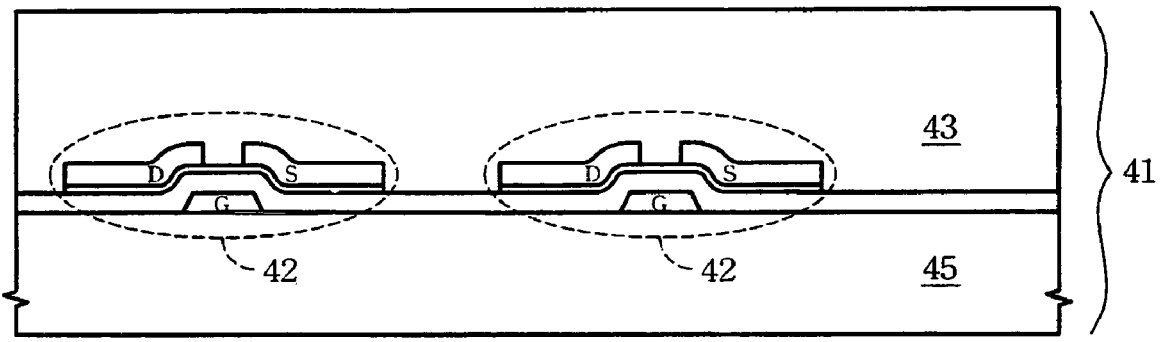
FIG. 7A to FIG. 7D are cross-sections of an embodiment of a method for manufacturing the touch panel of the present invention.

Referring to FIG. 7A to FIG. 7D. FIG. 7A to FIG. 7D are cross-sections of an embodiment of a method for manufacturing the touch panel of the present invention. As shown in FIG. 7A, the first step is to provide a thin film transistor substrate 41. The array of thin film transistors 42, the plurality of data lines (not shown) and the plurality of scan lines (not shown) have been formed on the base 45. And the protective layer 43 have been deposited over the array of thin film transistors 42, the plurality of data lines and the plurality of scan lines.

Figure 7B:
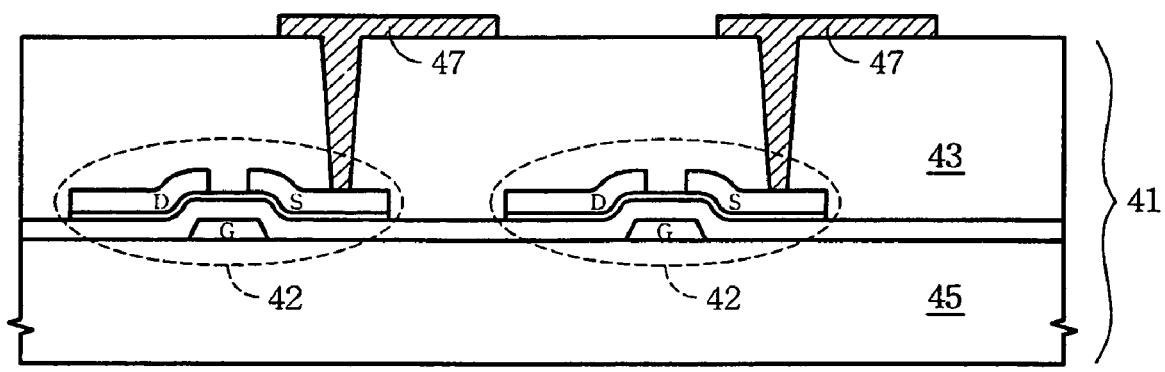

As shown in FIG. 7B, the following step is to form a plurality of conductive islets 47 on the thin film transistor substrate 41. Before forming the plurality of conductive islets 47, a plurality of through holes (no shown) are formed in the protective layer 43 so as to enable each of the conductive islets 47 to connect with one of the plurality of thin film transistors 42.

Figure 7C:
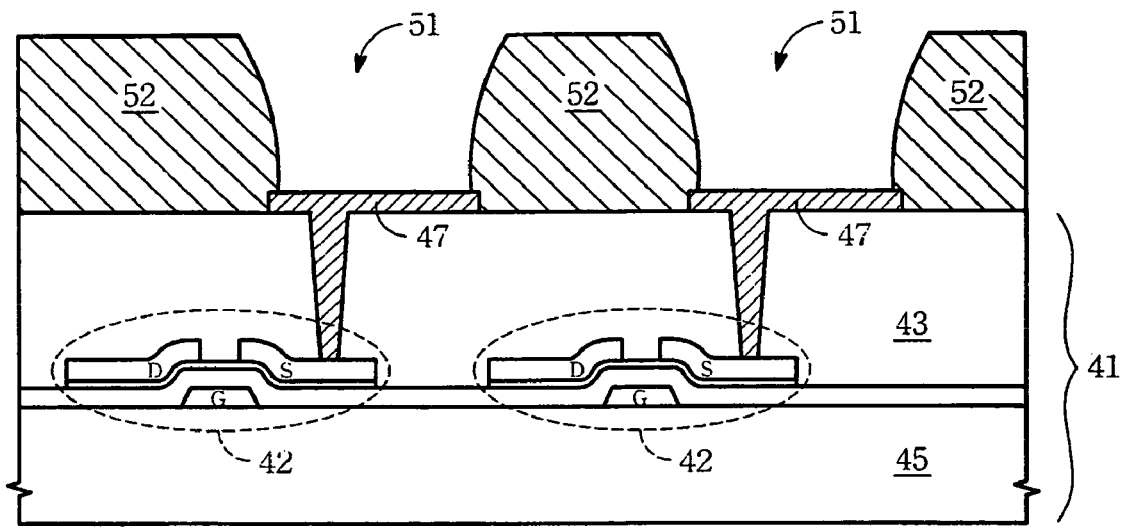

Referring to FIG. 7C. The supporting pattern layer 52 is formed above the thin film transistor substrate 41. The supporting pattern layer 52 has a plurality of apertures 51 for exposing at least part of each of the plurality of conductive islets 47. In this step, an insulating material layer is formed over the thin film transistor substrate 41, then a plurality of predetermined portions of the insulating material layer are removed to form the plurality of apertures 51 so as to provide the supporting pattern layer 52.

Figure 7D:
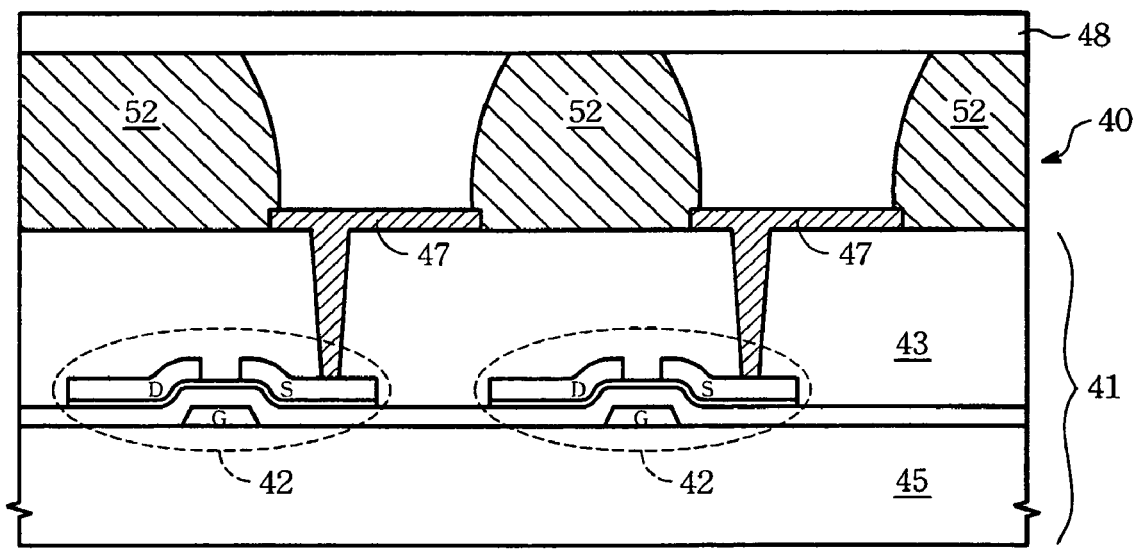

Referring to FIG. 7D. The elastic conductive film 48 is formed on the supporting pattern layer 52. After then, the touch panel 40 has been finished. The structure of the touch panel 40 shown in FIG. 7D is the same as the touch panel 40 shown in FIG. 3A and FIG. 3B.

Referring to FIG. 8A to FIG. 8H. FIG. 8A to FIG. 8H are cross-sections of another embodiment for manufacturing the touch panel of the present invention. The specific organic materials, which is used in the ultra high aperture (UHA) panel fabrication method, is adopted in this embodiment for the material of the supporting pattern layer 52. However, inorganic material, which is insulating, is able to be used, either.

Figure 8A:
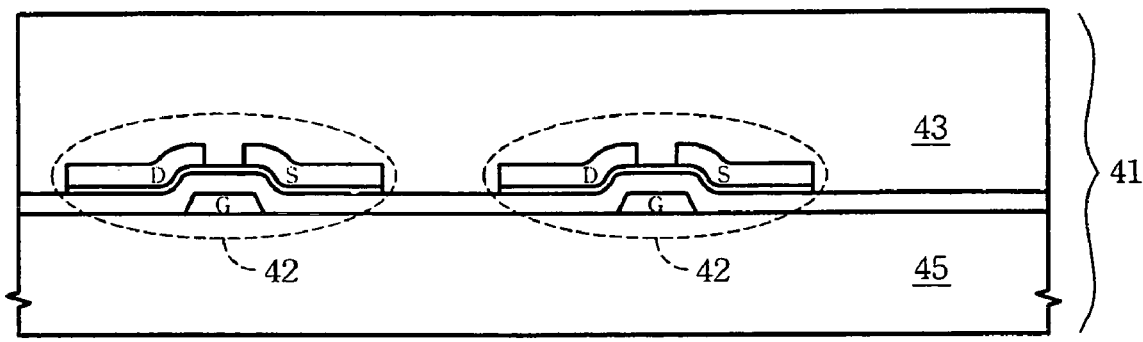
FIG. 8A to FIG. 8H are cross-sections of another embodiment for manufacturing the touch panel of the present invention.
Figure 8B:
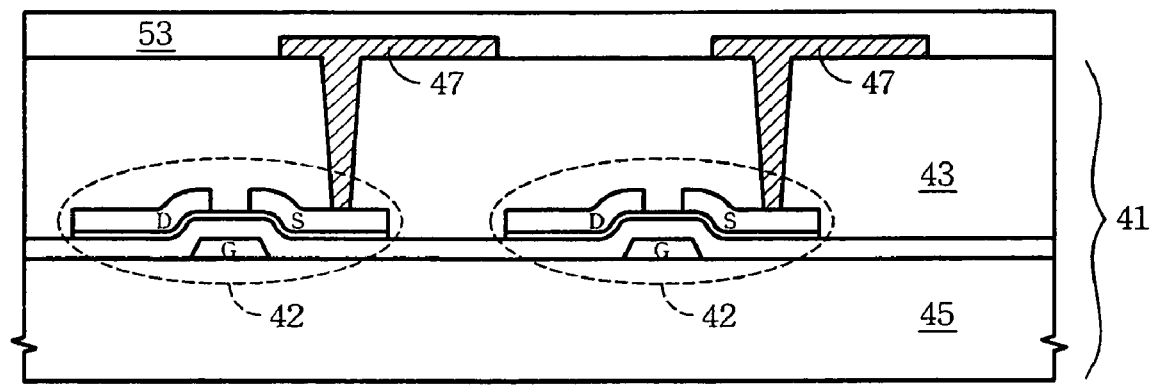

As shown in FIG. 8A, the step is to provide a thin film transistor substrate 41. Following, as shown in FIG. 8B, a plurality of conductive islets 47 are formed on the thin film transistor substrate 41. Before formed the plurality of conductive islets 47, a plurality of apertures 51 are formed in the protective layer 43 so as to enable each of the conductive islets 47 electrically connected to one of the plurality of thin film transistors 42. In present embodiment, a auxiliary protective layer 53 is formed to cover the conductive islets 47 for protecting the conductive islets 47 at the following step of forming the supporting pattern layer 52.

Figure 8C:
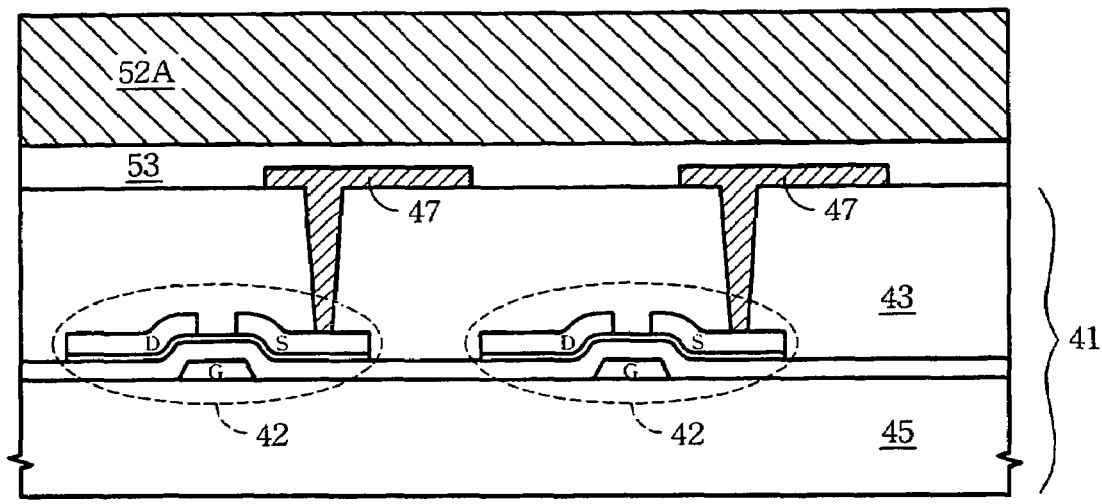
Figure 8D:
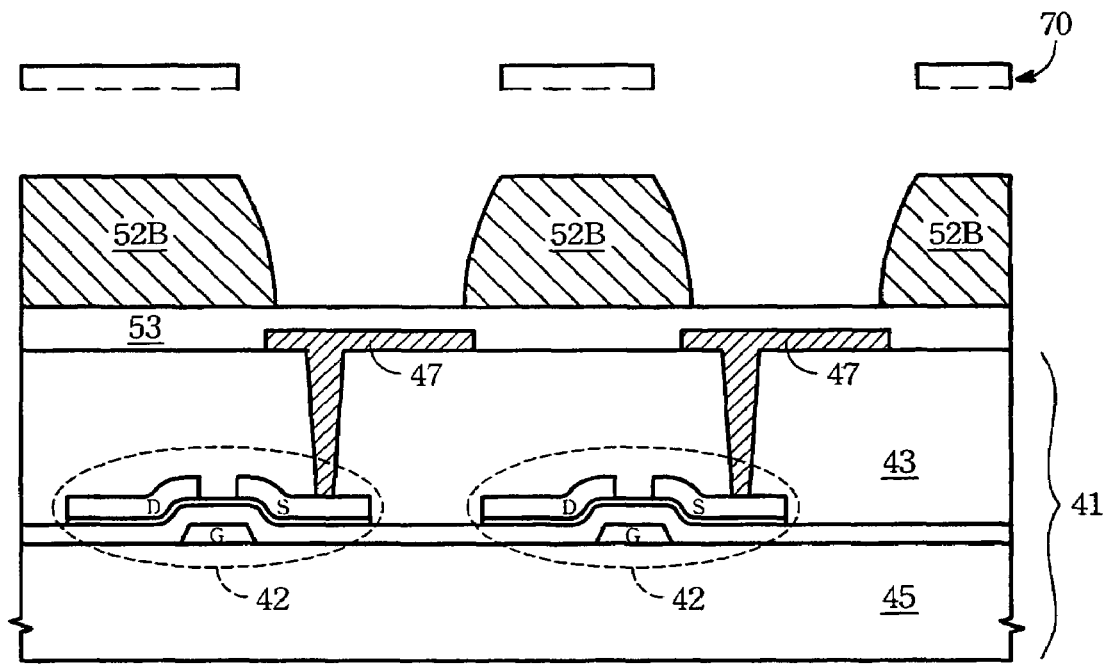
Figure 8E:
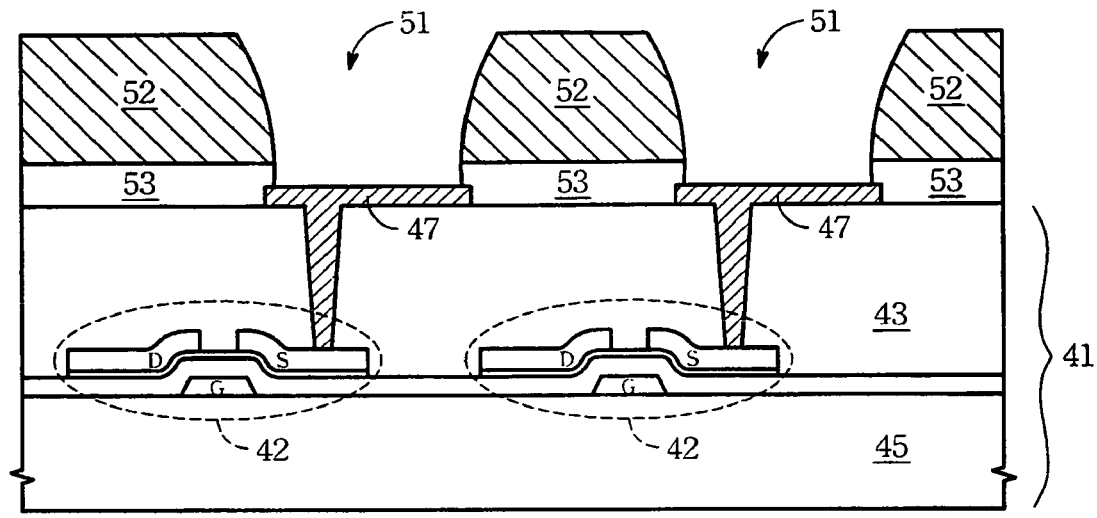

FIG. 8C to FIG. 8E are used for illustrating the step of forming the supporting pattern layer 52. As shown in FIG. 8C, the specific organic material 52A is forming on the thin film transistor substrate 41 for covering the auxiliary protective layer 53. Predetermined portions of the specific organic material 52A are etched by utilizing a mask 70 to form an organic retaining layer 52B (as shown in FIG. 8D). The mask 70 is selected from a half-tone mask, a gray-level mask, a slit-pattern mask, or a traditional mask. The organic retaining layer 52B is used as an etching masking while removing predetermined portions of the auxiliary protective layer 53 by an etching process. As a result, a plurality of apertures 51 are formed as shown in FIG. 8E for exposing at least part of each of the plurality of conductive islets 47. Meanwhile, the supporting pattern layer 52 is formed after the etching process toward the organic retaining layer 52B.

Figure 8F:
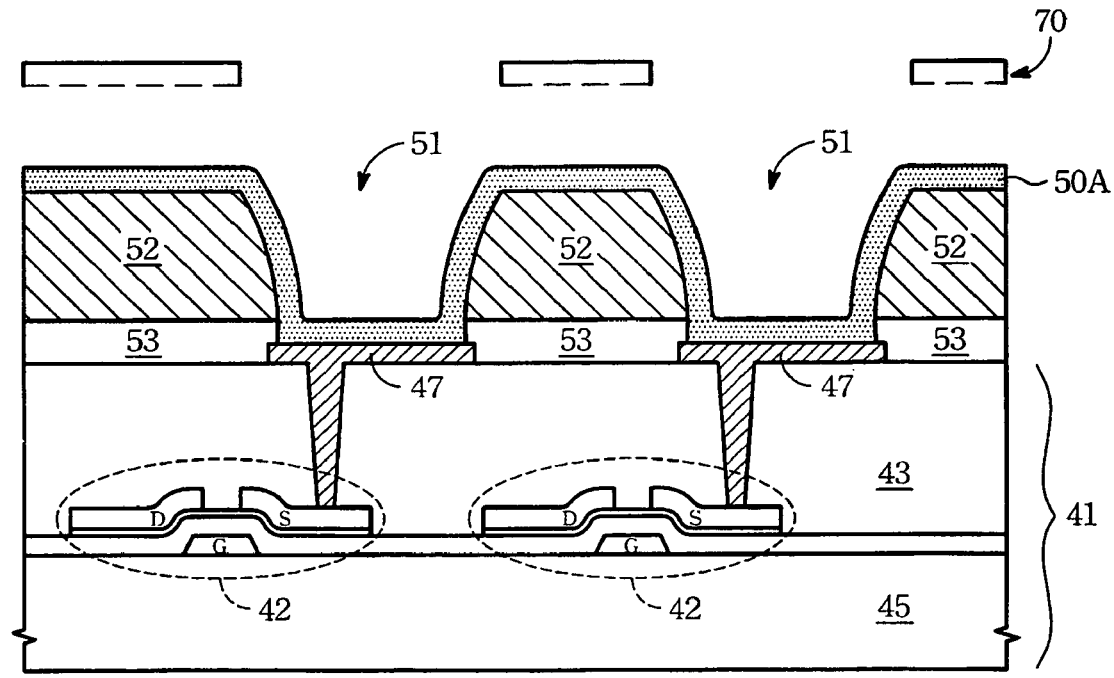
Figure 8G:
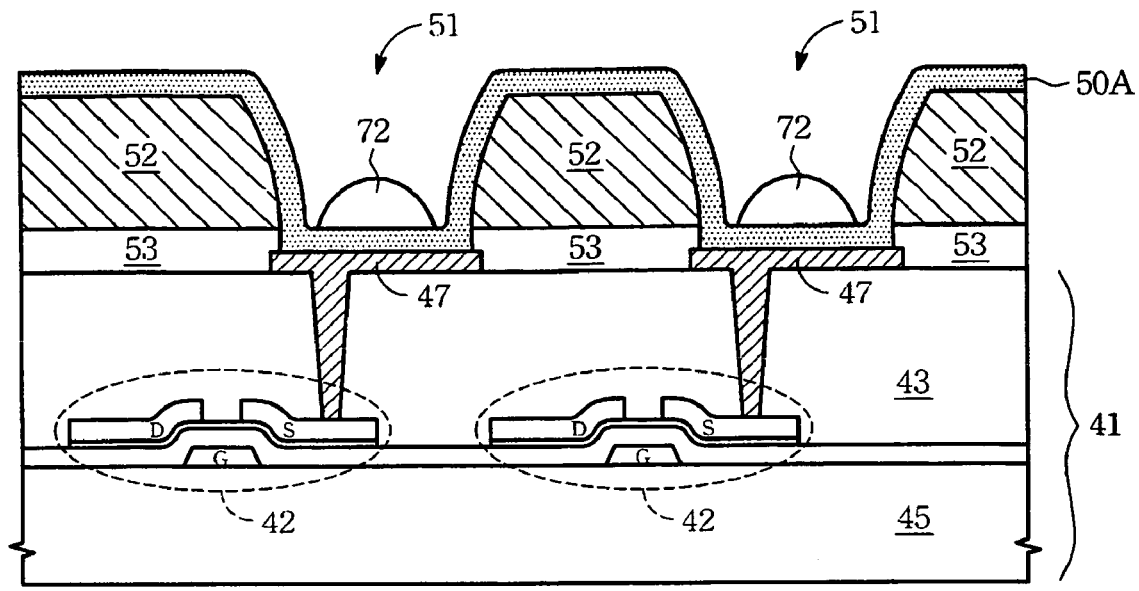
Figure 8H:
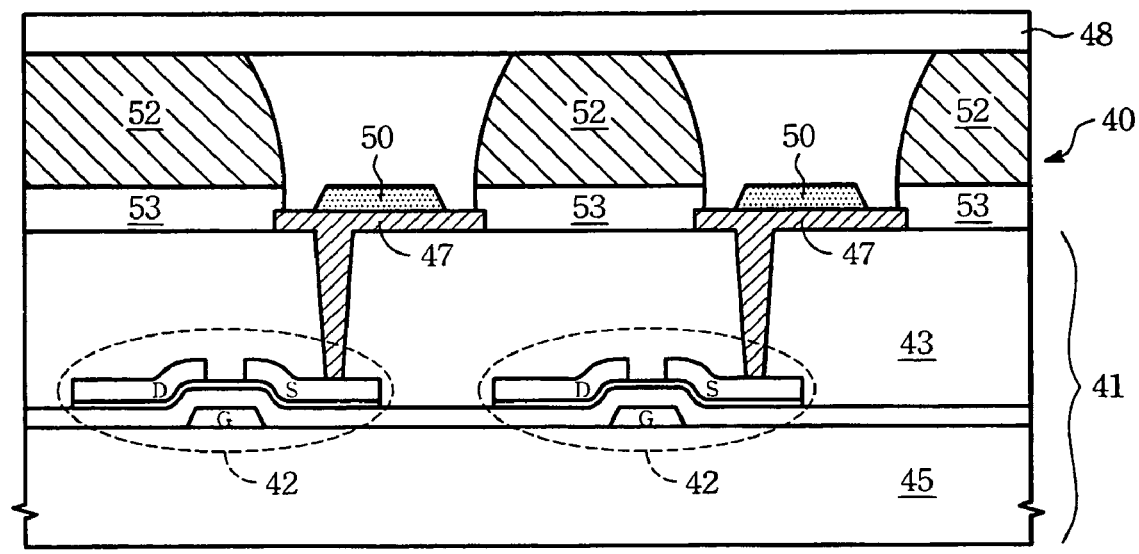

Referring to FIG. 8F to FIG. 8H. FIG. 8F to FIG. 8H are used for illustrating the step of forming the conductive protrusion 50 in the aperture 51 after the conductive islet 47 is exposed. As shown in FIG. 8F, a metal material layer 50A is deposited. Then, the mask 70 is utilized again to define a photoresist 72 in each aperture 51. However, in this step, the photoresist 72 belongs to the negative photoresist type so as to use the same mask 70 as shown in FIG. 8D to save cost. Finally, predetermined portions of metal material layer 50A, where are not covered by the photoresist 72, are removed by etching to form the plurality of the conductive protrusions 50. All of the photoresist 72 is further removed for exposing the conductive protrusion 50 as shown in FIG. 8H. The thickness of the supporting pattern layer 52 is substantially greater than the thickness of the conductive protrusion 50. In other words, the height of the supporting pattern layer 52 is substantially greater than the height of the conductive protrusion 50. Then, after the step of forming the elastic conductive layer 48 on the supporting pattern layer 52, the present embodiment of manufacturing method is completed.

As described above, the present invention provides a touch panel, which is suitable to be applied to an electronic apparatus, particularly to electronic apparatus that comprises display screen, such as tablet computer, monitor, or display panel. The supporting pattern layer of the present touch panel is capable of providing a solid and evenly distributed supporting force to the elastic conductive film. Product life time of the touch panel is able to be elongated of the present invention. Besides, the flatness of the elastic conductive film is also improved. Furthermore, the touch panel of the present invention is capable of maintaining display quality of the display screen because of its transparent property. The manufacturing method of the present touch panel is full concerned with the factor of convenience and cost. Hence, product competitiveness is able to be promoted of the present invention.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A touch panel for an electronic apparatus, comprising:
   a thin film transistor substrate;
   a plurality of conductive islets formed on the thin film transistor substrate;
   a supporting pattern layer, formed above the thin film transistor substrate, having a plurality of apertures for exposing at least part of each of the plurality of conductive islets;
   at least one conductive protrusion formed in at least part of the plurality of apertures and formed on at least part of each of the plurality of conductive islets, wherein the thickness of the supporting pattern layer is substantially greater than the thickness of the conductive protrusion; and
   an elastic conductive film formed on the supporting pattern layer.

2. The touch panel of claim 1, further comprising:
   an auxiliary protective layer formed below the supporting pattern layer.

3. The touch panel of claim 1, wherein the supporting pattern layer is transparent, translucent, or opaque.

4. The touch panel of claim 1, wherein the supporting pattern layer comprises polycarbonate (PC), benzocyclobutene (BCB), acryl organic material, fluorine-added polyimide, a compound consisting of silicon, carbon and oxygen (SixOyCn), Teflon, Parylene, a silicon compound consisting of carbon, hydrogen, oxygen, a silicon compound consisting of nitride, oxide or both of nitride and oxide, an phosphosilicate glass (PSG) doped with ions, a metal oxide, or combinations thereof.

5. The touch panel of claim 1, wherein the conductive islet comprises indium-tin oxide, indium-zinc oxide, oxide, gold, aluminum, platinum, palladium, copper, molybdenum, titanium, aluminum, conductive rubber, or combinations thereof.

6. The touch panel of claim 1, wherein the conductive protrusion comprises indium-tin oxide, indium-zinc oxide, oxide, gold, aluminum, platinum, palladium, copper, molybdenum, titanium, aluminum, conductive rubber, or combinations thereof.

7. The touch panel of claim 1, wherein the shape of each of the plurality of apertures is rhombus, square, circle, oval, or polygon.

8. The touch panel of claim 1, wherein the shape of the conductive protrusion is substantially corresponding to the shape of the apertures.

9. A method for manufacturing a touch panel, comprising:
   providing a thin film transistor substrate;
   forming at least one conductive islet on the thin film transistor substrate;
   forming a supporting pattern layer, having a plurality of apertures, above the thin film transistor substrate for exposing at least part of the conductive islet;
   forming at least one conductive protrusion in at least part of each of the plurality of apertures and on at least part of the conductive islet, so that the thickness of the supporting pattern layer is substantially greater than the thickness of the conductive protrusion; and
   forming an elastic conductive film on the supporting pattern layer.

10. The method of claim 9, wherein formation of the supporting pattern layer comprises:
    forming an insulating material layer over the thin film transistor substrate; and
    removing a predetermined portion of the insulating material layer to form the plurality of apertures.

11. The method of claim 10, wherein the insulating material layer comprises polycarbonate (PC), benzocyclobutene (BCB), acryl organic material, fluorine-added polyimide, a compound consisting of silicon, carbon and oxygen (SixOyCn), Teflon, Parylene, a silicon compound consisting of carbon, hydrogen, oxygen, a silicon compound consisting of nitride, oxide, or both of nitride and oxide, an phosphosilicate glass (PSG) doped with ions, a metal oxide, or combinations thereof.

12. The method of claim 9, further comprising:
    forming an auxiliary protective layer on the supporting pattern layer.

13. The method of claim 9, wherein the conductive islet comprises indium-tin oxide, indium-zinc oxide, oxide, gold, aluminum, platinum, palladium, copper, molybdenum, titanium, aluminum, conductive rubber, or combinations thereof.

14. The method of claim 9, wherein the conductive protrusion comprises indium-tin oxide, indium-zinc oxide, oxide, gold, aluminum, platinum, palladium, copper, molybdenum, titanium, aluminum, conductive rubber, or combinations thereof.

* * * * *